United States Patent
Umili et al.

(10) Patent No.: US 10,140,802 B2
(45) Date of Patent: Nov. 27, 2018

(54) AUTOMATED DISPENSING APPARATUS

(71) Applicant: ABG SYSTEMS SRL, Lacchiarella (MI) (IT)

(72) Inventors: Stefano Umili, Torre d'Isola (IT); Giovanni Mastrojanni, Pavia (IT)

(73) Assignee: ABG SYSTEMS SRL, Lacchiarella (MI) (IT)

( * ) Notice: Subject to any disclaimer, the term of this patent is extended or adjusted under 35 U.S.C. 154(b) by 0 days.

(21) Appl. No.: 15/528,784

(22) PCT Filed: Dec. 2, 2015

(86) PCT No.: PCT/IB2015/059275
§ 371 (c)(1),
(2) Date: May 23, 2017

(87) PCT Pub. No.: WO2016/088053
PCT Pub. Date: Jun. 9, 2016

(65) Prior Publication Data
US 2017/0316634 A1    Nov. 2, 2017

(30) Foreign Application Priority Data

Dec. 4, 2014  (IT) .............................. MI2014A2088

(51) Int. Cl.
*G07F 11/04* (2006.01)
*G06K 7/10* (2006.01)

(52) U.S. Cl.
CPC .......... *G07F 11/04* (2013.01); *G06K 7/10366* (2013.01)

(58) Field of Classification Search
CPC ...... G07F 11/54; G07F 11/04; G06K 7/10366
(Continued)

(56) References Cited

U.S. PATENT DOCUMENTS 4,317,604 A * 3/1982 Krakauer ................ G07F 11/54
                                                          312/125
4,498,603 A * 2/1985 Wittenborg ............. G07F 11/54
                                                          221/120
(Continued)

FOREIGN PATENT DOCUMENTS

EP        2518704 A1    10/2012

OTHER PUBLICATIONS

PCT International Search Report and Written Opinion dated Feb. 2, 2016 for Intl. App. No. PCT/IB2015/059275, from which the instant application is based, 8 pgs.

*Primary Examiner* — Toan Ly
(74) *Attorney, Agent, or Firm* — Fredrikson & Byron, P.A.

(57) ABSTRACT

An automated dispensing apparatus for the controlled dispensing of articles provided with associated RFID tags, comprises hatches (14) for opening article entry/exit zones and an internal motor-driven store (13) with shelves (15) divided up into a plurality of compartments (16) and intended to receive articles to be dispensed, upon command, through the hatches (14). The control unit (18) provided with a memory (30) intended to memorize the contents of the store and is connected to the store (13) in order to be able to operate the store so as to bring a selected compartment (16) into loading and unloading positions and allow the loading/unloading of an article inside the compartment. Inside the apparatus there is at least one RFID tag reader element (31, 131) which is connected to the control unit (18) and the control unit (18) is adapted to receive from the reader element (31, 131) data read by the reader element from an RFID tag and associate said data in the memory (30) with the compartment (16) which at that moment is close to the (Continued)

reader element (31, 131). A method for controlling the apparatus is also described.

9 Claims, 4 Drawing Sheets

(58) Field of Classification Search
USPC .......................................................... 235/383
See application file for complete search history.

(56) References Cited

U.S. PATENT DOCUMENTS

| | | | | |
|---|---|---|---|---|
| 4,927,051 | A * | 5/1990 | Falk | G07F 11/54 |
| | | | | 194/350 |
| 7,925,375 | B2 * | 4/2011 | Schininger | G07F 11/007 |
| | | | | 221/131 |
| 8,712,586 | B2 * | 4/2014 | Allinson | G07F 17/0092 |
| | | | | 221/133 |
| 2005/0216120 | A1 * | 9/2005 | Rosenberg | G07F 9/02 |
| | | | | 700/244 |
| 2007/0187423 | A1 | 8/2007 | Bedore et al. | |
| 2011/0245969 | A1 | 10/2011 | Monto et al. | |
| 2012/0012606 | A1 * | 1/2012 | Longley | G07F 11/58 |
| | | | | 221/92 |
| 2013/0253700 | A1 * | 9/2013 | Carson | G07F 9/006 |
| | | | | 700/236 |

* cited by examiner

AUTOMATED DISPENSING APPARATUS

RELATED APPLICATIONS

This application is a 35 U.S.C. 371 national stage filing from International Application No. PCT/IB2015/059275, filed Dec. 2, 2015, which claims priority to Italian Application No. MI2014A002088, filed Dec. 4, 2014, the teachings of which are incorporated herein by reference.

The present invention relates to an automated dispensing apparatus intended to dispense objects such as, in particular, folded articles of clothing, but also medicinal products, medical/surgical products, food items, etc.

The automated dispensing apparatus to which reference is made here are apparatus in which it is often necessary to ensure the correct dispensing of the article requested from among many (even hundreds) of articles contained in the internal store. Moreover, often in these apparatus it is required to avoid handling of the articles already loaded in the store and/or know how long ago the article was loaded in the store and before which date it may be removed.

In such apparatus the store is therefore generally not fully accessible except for maintenance operations and the person responsible for filling the apparatus does not have unrestricted access to the inside thereof, the filling procedure being usually more complex and structured.

For example, the articles which can be dispensed by these apparatus may be articles of clothing, such as uniforms or parts of uniforms, to be used in the health and/or industrial sector and also for critical applications, such as clothes and accessories used in operating theatres or the like.

Here the generic term "article of clothing" is also understood as meaning a set of garments and/or clothing accessories, which are to be supplied as a set, for example a combination of a top and trousers or cap and overshoes, gloves, etc., as may be easily imagined by the person skilled in the art.

Similarly, "article" is understood also as meaning a set of several objects, such as articles of clothing, which are intended to be dispensed together.

The automated dispensing apparatus of the said type usually comprise an internal store divided into compartments and a controlled access system which allows access to one given compartment at a time based in predetermined criteria. The compartments are intended to contain the articles to be dispensed and the apparatus may be programmed to distribute, upon request, the articles in accordance with specific requirements. For example, in the case of articles of clothing, the articles may be dispensed for example according to size, type of garment, intended use, etc., with access being selectively provided to the right compartment.

In particular, in the health sector it may be useful for the various garments which must be used in an operating theatre to be directly dispensed in the changing room according to the size and/or type needed for each specific person who accesses it and who is recognized by the apparatus by means of a code, badge or other system, so as to supply the garments in a personalized manner.

The store inside the apparatus is advantageously divided up into shelves and radial sectors on each shelf, so that each shelf has a plurality of radial compartments which are open on the peripheral face of a cylinder.

Externally the dispensing apparatus is provided with a vertical row of controlled access hatches, each corresponding to a shelf of the store, and the cylinder of the store is motor-driven so as to rotate, upon command, the shelves so as to bring the compartments of a shelf into alignment sequentially one at a time with the corresponding hatch.

In this way, when a particular article present in the store is requested (for example by entering a command in the withdrawal system using a keypad, an identification badge, etc.), the control system of the apparatus causes the movement of the store so as to bring the corresponding compartment, which contains that article, into the withdrawal position behind a hatch and then causes opening of the hatch.

Obviously, in order to operate correctly, the apparatus must have stored the contents of each compartment, so as to be able to trace the article requested and operate the store so as to bring it into the withdrawal position and allow removal thereof.

In the prior art, the operator who periodically fills the empty compartments with the missing articles, whenever he/she places a new article inside each empty compartment, memorizes in the apparatus the information necessary for subsequent location thereof. In the case of articles of clothing, the information may comprise for example, depending on the need and use of the dispenser, one or more sizes, serial number of the article, type of garment or use, proprietor, category of the user, etc., or also a simple code identifying the article which allows the system to find in a suitably programmed database the other information necessary for dispensing.

In order to enter the information when inserting the articles, the operator may use for example a keyboard or, advantageously a suitable manual scanner which is connected to the machine and which reads a special identification element present in the article to be inserted or (if the articles are inserted in the compartments inside a wrapping) present in the wrapping containing it.

The identification element associated with the article may be, for example, a label with an optical code, such as a base code or the like, an electronic tag such as an RFID tag, a magnetic tag or another suitable identification element of the known type.

The system must, however, also memorize the association between the article introduced and the compartment in which it has been inserted. In order to achieve this, apparatus have been proposed where the control system opens only one empty compartment at a time and/or signals the compartment with an associated indicator lamp so that the operator inserts the article into the compartment at the moment chosen by the apparatus to be filled.

This reduces the possible loading errors, resulting in the operator having to follow a specific procedure. In fact, for each article to be introduced, the operator must enter in the machine, manually or with the scanner, the reference number of the article to be introduced, wait for the consent from the control system, identify the compartment assigned by the system, introduce the article into it, wait for the compartment to be closed and then pass to the next article.

The filling operations are therefore somewhat slow and relatively complex.

Since an apparatus of the said type may also have various hundreds of compartments to be filled, it is evident that the time needed to refill the store may be relatively long, also with consequent long machine downtimes.

Moreover, loading errors may arise, resulting possibly in a wrong association between the article in a compartment and the compartment itself. For example, it may happen that the operator introduces the information about an article, but then (albeit because distracted or not paying attention) mistakenly inserts into the compartment a different article, this error often not being readily noticed. For example, in the case of articles of clothing, it may be difficult to recognize at a first glance the size and/or the intended use when the article is folded and in some cases also wrapped.

Such loading errors result in subsequent erroneous dispensing of the article which may not only create inconvenience (for example in the case of a wrong size of a garment), but may also be potentially dangerous (for example in the case where particular garments for a specific use are needed, in some cases urgently.

To avoid wrong operations, EP2518704 discloses an apparatus for the distribution of food products with an RFID reader near a loading door to check that the product inserted in a compartment is the product that has been set previously for the compartment.

US2011/245969 discloses instead an apparatus to distribute medicinal products. A RFID reader can avoid being dispensed a wrong medicinal product.

US2007/187423 discloses an apparatus with multiple cartridge to dispense medicinal product. Barcode or RFID can avoid errors in the containers already loaded.

A general object of the present invention is to provide an apparatus for the automated dispensing of articles, in particular articles of clothing, which allows precise and rapid loading of the articles during filling of the store, for subsequent correct dispensing of the articles.

In view of this object the idea which has occurred according to the invention is to provide an automated dispensing apparatus for the controlled dispensing of articles provided with associated RFID tags, comprising hatches for opening article entry/exit zones toward the outside of the apparatus, an internal motor-driven store with shelves divided up into a plurality of compartments and intended to receive articles to be dispensed, upon command, via the hatches, a control unit provided with a memory intended to memorize the contents of the store, the control unit being connected to the store in order to be able to operate the store so as to bring a selected compartment into loading and unloading positions and allow the loading/unloading of an article inside the compartment, characterized in that an RFID tag reader element is provided and is connected to the control unit and the control unit is adapted to receive from the reader element data read by the reader element from an RFID tag and associate said data in the memory with the compartment which at that moment is close to the reader element.

Still according to the invention the idea which has also occurred is to provide a method for controlling a dispensing apparatus of the said type, comprising the steps, performed by the control unit, of moving the store so as to bring into the loading position at least one compartment to be loaded; allowing the access to the at least one compartment so as to allow loading into the compartment of an article provided with an RFID tag; reading the data from the RFID tag of the article by means of a reader element associated with the at least one compartment; associating in the memory of the control unit the data read by the reader element and information about the position of the loaded article, so as to allow subsequent location of the article placed inside the compartment.

In order to illustrate more clearly the innovative principles of the present invention and its advantages compared to the prior art, an example of embodiment applying these principles will be described below with the aid of the accompanying drawings. In the drawings.

Figure 1:
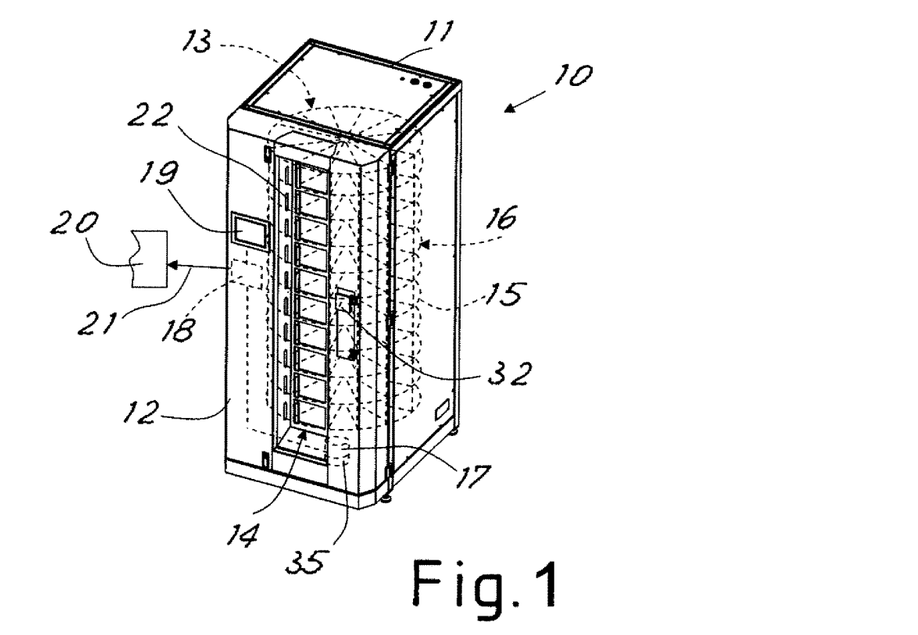
FIG. 1 shows a schematic perspective view of a dispensing apparatus according to the invention.

With reference to the figures, FIG. 1 shows an automated dispensing apparatus, denoted generally by 10, according to the invention.

The apparatus will be intended to manage articles of the known type provided with RFID recognition tags. These articles are generally associated beforehand with an RFID tag in a known manner which depends on the type of article and also, advantageously, on other needs for identifying the article during its cycle of use. The articles may be of any desired type.

For example, in the case of articles of clothing, the tag may be stitched beforehand into the article and the useful data for recognizing and processing the article may be suitably memorized beforehand in the tag and/or in the database system, as known to the person skilled in the art, so as to ensure among other things the traceability of the article also during further steps which the article must undergo and which may consist, for example, in return, washing, repackaging, redistribution and other steps. The data may also be updated during the processing steps (for example so as to store in the tag the number of washing cycles which the article has undergone).

The apparatus 10 comprises an external box-like housing 11, for example in the form of a metal cabinet, provided advantageously with a main door 12 (preferably the entire front side) which can be opened by authorized personnel, preferably via a lock. Access inside the apparatus via the main door is usually performed by the personnel responsible for internal maintenance of the apparatus and, if necessary, may be denied to the personnel responsible for refilling the store.

The housing 11 is provided internally with a store 13 intended to contain the articles which must be selectively dispensed through the access hatches 14 which open, upon command, the zones for entry/exit of the articles. The store is movable so as to transport, upon command, the articles into a withdrawal position.

In the embodiment shown, the store advantageously consists of a structure formed by a plurality of shelves 15 divided up into compartments or cells 16. Preferably, the compartments are radial and open radially on the peripheral face of a cylinder. Advantageously, the compartments of the various shelves are arranged on top of each other and vertically aligned in vertical columns so that an entire column of compartments at a time is positioned aligned with the hatches 14 arranged in a vertical row.

The store is motor-driven in a manner known per se so that the movement of the shelves may bring sequentially the compartments into an unloading or loading position. Advantageously, these positions are aligned with the access hatches, as will be clarified below.

The drive system, denoted generally by 17, is of the type known per se and may be easily imagined by the person skilled in the art. For example, the entire store may rotate integrally about a central axis 24 thereof, arranged vertical, by means of a single rotational motor. Alternatively, the single shelves may be designed such that they can be moved or rotated about the vertical axis 24 independently of each other.

The movement of the store is controlled by an electronic control unit 18 which manages operation of the apparatus. This control unit 18 (advantageously designed with a suitably programmed microcontroller system, known per se, which may be easily imagined by the person skilled in the art) is connected to a user interface 19, for example designed with a keyboard and display or a touch screen. Moreover, the control unit 18 may be connected to a remote control, management and/or database system 20 via a suitable known electronic communication interface 21.

Each hatch 14 is advantageously provided with a locking/release mechanism 26 (for example an electric lock) which is again operated by the control unit 18. Preferably, each hatch is also provided with an indicator lamp 22 connected to the control unit. The apparatus may also comprise a known reader 32 for identification cards or badges of the user and/or the operator.

Figure 2:
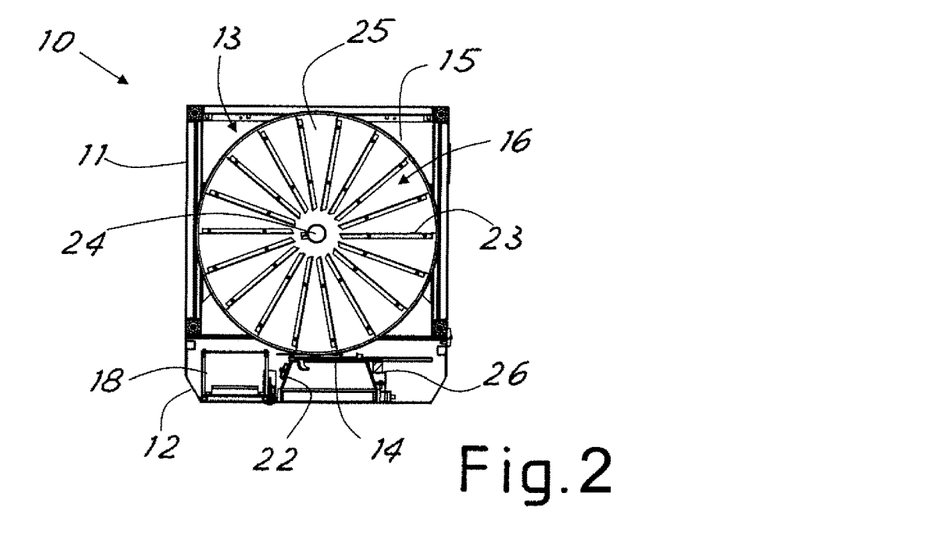
FIG. 2 shows a schematic horizontally sectioned view of the apparatus according to FIG. 1.

FIG. 2 is a cross-section through the apparatus showing a shelf of the store advantageously formed by a base disk 25 having, fixed thereon, radial partitions 23 which laterally define and separate the compartments 16.

Each hatch 14 for access to the compartment 14 may be advantageously of the sliding type. The sliding action may also be motor-driven. In this case, the locking/release mechanism 26, if present, may be designed for or comprise a suitable electric motor for the hatch sliding movement.

Figure 3:
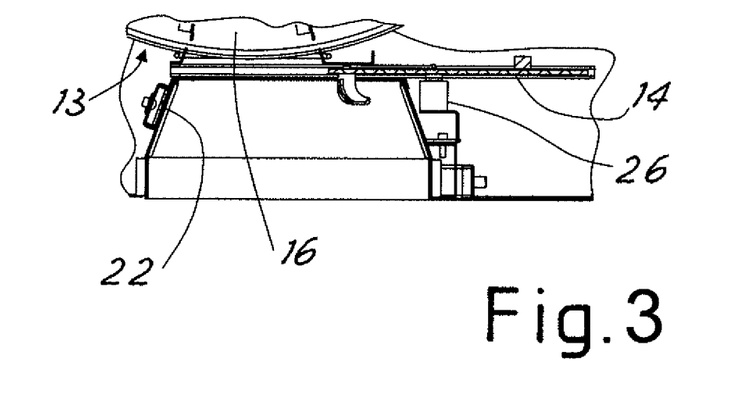
FIG. 3 shows a schematic horizontally sectioned view of an entry/exit zone of the apparatus according to the invention.

FIG. 3 shows an enlarged detail of the entry and exit zone with the sliding hatch displaced into the open position so as to allow access to the rear-lying compartment of the store.

The dispensing apparatus comprises internally electronic means for reading the RFID tags associated with the articles intended to be dispensed by the apparatus. These reading means comprise a plurality of RFID tag reader elements and, preferably, a reader element for each shelf, with the reader element which is arranged so that, in a predetermined movement position of the store, a compartment of the shelf is located in the vicinity of the reader element. For example, advantageously, the reader element is located close to a compartment which is moved into a predetermined position of angular rotation of the corresponding shelf.

The reader elements may each consist of a suitable antenna connected to an electronic reading circuit, substantially both known from the prior art and therefore not described or shown further here, being able to be easily imagined by the person skilled in the art. All the reader elements are connected to the control unit 18 so that the unit may read the RFID tags detected by the reader elements and acquire the data relating to the articles associated therewith. As may be easily imagined by the person skilled in the art, the RFID tags associated with the articles may contain directly all the data considered necessary for subsequent selection and dispensing of the right article or may contain "index" information which allows recovery of the data inside a database previously stored in the control unit 18 and/or accessible remotely (for example in the remote system 20).

Advantageously, the reader elements will be sequentially interrogated by the control unit in order to acquire the readings of the tags detected by each reader.

The apparatus will also be provided with an electronic system 35, known per se, for indexing its angular position or rotation (for example in the form of an encoder) such that the control unit may always determine which compartments are situated in the loading or unloading positions and which movement to impart to the store in order to position a required compartment behind the hatches. This system 35 may, for example, be incorporated in or associated with the drive unit 17.

As will be clarified below, identification of the compartment (i.e. the position information of a compartment) may for example be achieved by a progressive compartment number or by a pair of indices such as shelf and progressive number of the compartment on the shelf, starting from a predetermined first compartment or compartment "1", owing to the position data of the store provided by the index system 25 and by the shelf onto which the article is introduced, detected by the specific reader element and/or by the system for controlling opening of the shelf for introducing the article.

Figure 4:
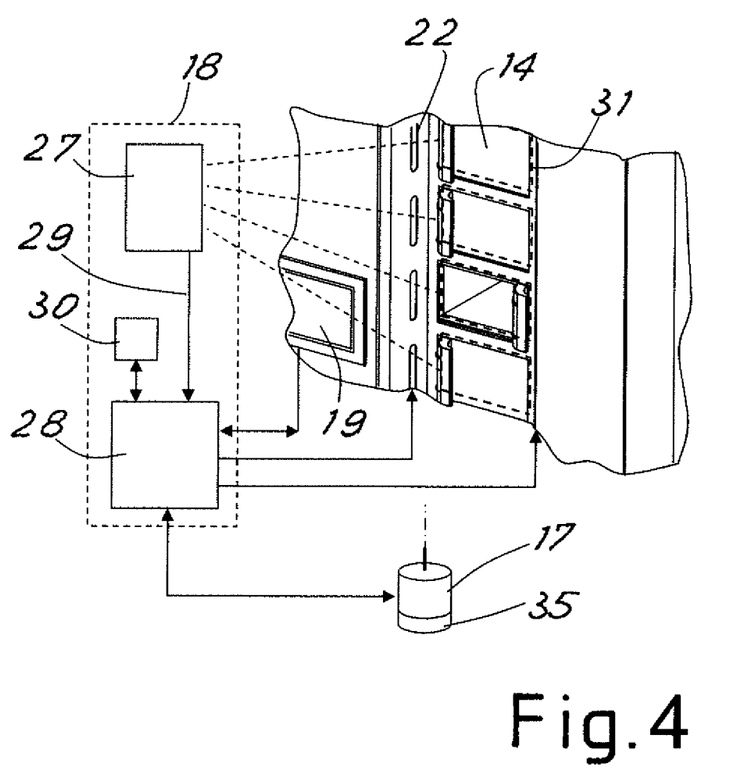
FIG. 4 shows an enlarged schematic view of a detail of a first embodiment of an example of the apparatus according to FIG. 1.

FIG. 4 shows in schematic form an advantageous structure of the control unit 18 which comprises a sequential scanning block or circuit 27 connected to the plurality of reader elements with which the apparatus is provided and a processing and control block or circuit 28 which receives sequentially the readings 29 carried out by the block 27 in order to store them in a memory 30 together with the reference to an associated compartment, as will be clarified below. Using a multiplexer system, it will be also possible to read, sequentially, but more or less simultaneously, a relatively large number of reader elements, thus simplifying the reading electronics. For example, each reader element may comprise solely the antenna, while the electronic reading circuit may consist of one only for all the antennas and be connected sequentially via a multiplexer to each antenna.

FIG. 4 also shows a first embodiment of the reader elements (denoted generally by 31) where they are advantageously arranged each close to a zone for entry/exit of the articles through a hatch 14, so as to be able to read the tags of articles passing through this entry/exit zone. The exact form and position of the reader elements will also depend on the specific type of tag used (for example HF or UHF) and on the range of the reading system, as may be easily imagined by the person skilled in the art. Preferably, each element is arranged between the hatch and the rear-lying compartment.

For example, the reader elements 31 may comprise an antenna with reading spirals arranged around, or in the vicinity of, the access opening of each hatch.

Figure 5:
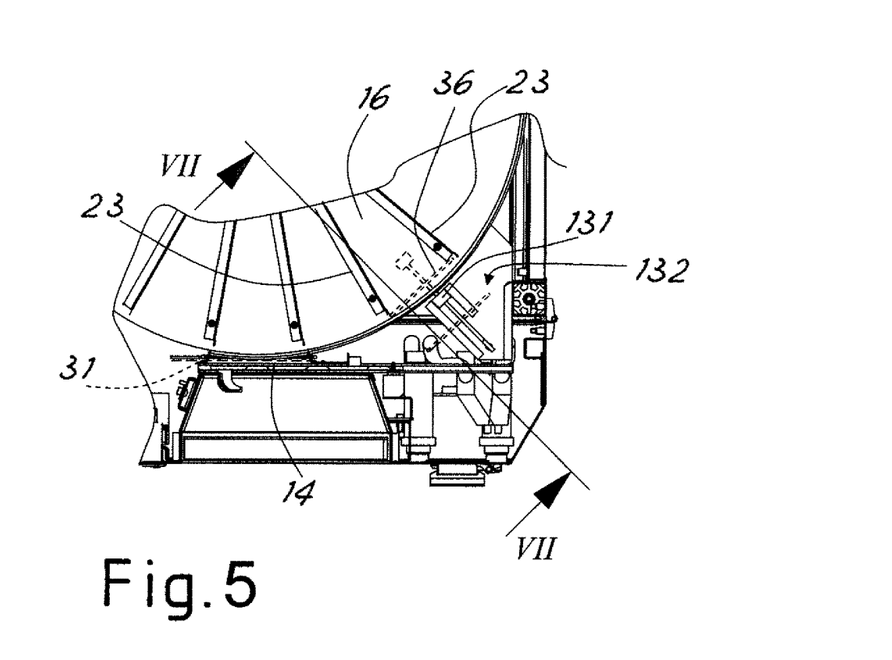
FIG. 5 shows a partial, schematic, horizontally sectioned view of a second embodiment of the apparatus according to FIG. 1.
Figure 6:
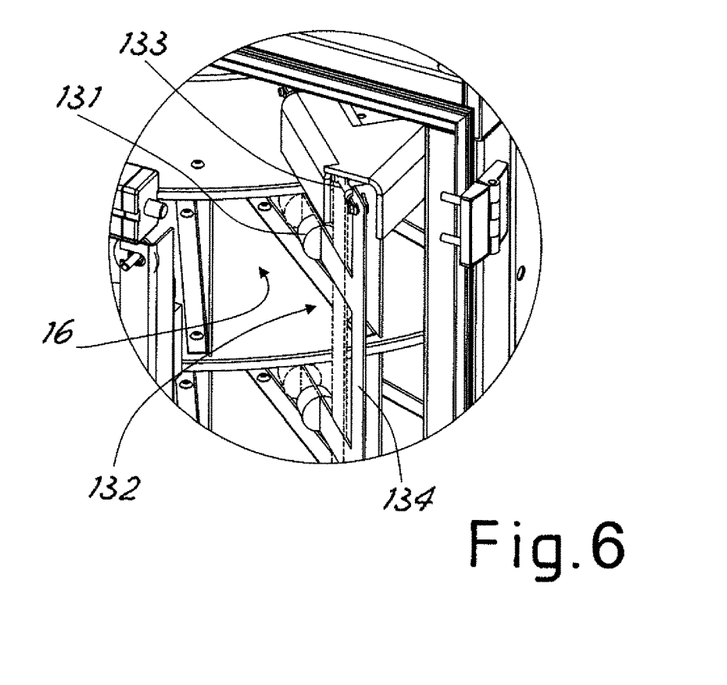
FIG. 6 shows a partial, schematic, perspective view of the embodiment shown in FIG. 5.
Figure 7:
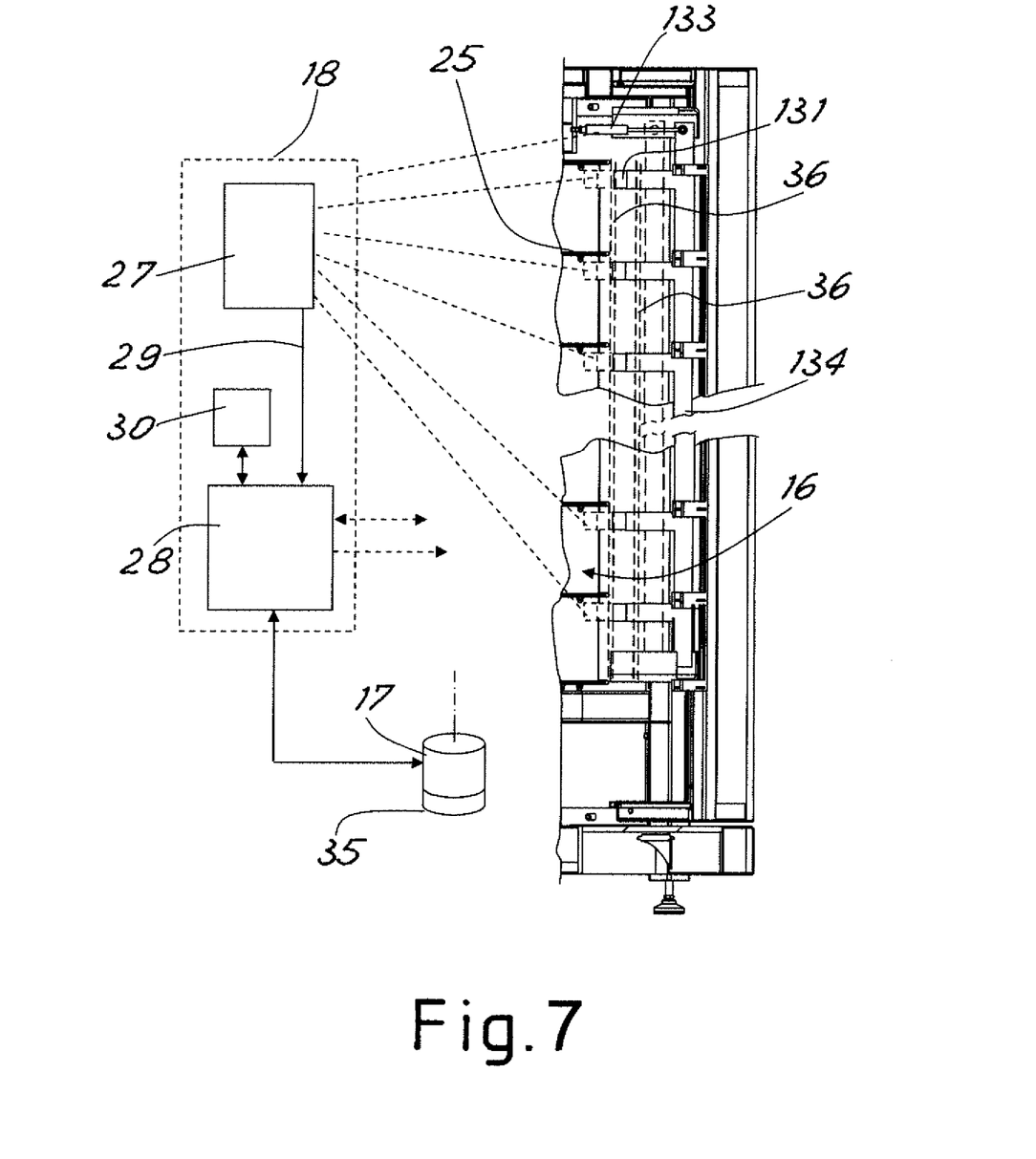
FIG. 7 shows a partial, schematic, cross-sectional view along the line VII-VII of FIG. 5.

FIGS. 5, 6 and 7 show a variation of embodiment of the reading means of the automated dispensing apparatus according to the invention.

In this variant the reader elements (denoted generally by 131) are advantageously arranged in a position which is different from the position of the zones for access via the hatches 14. In the case of a rotating store, the two positions will be two different angular positions around the store.

The position of the reader elements is the position for reading the contents of the compartments by means of the tags via the reader elements.

The reader elements (advantageously always one per shelf) are in fact positioned so as to read the contents of the compartments brought into this position, or reading position, owing to a movement of the store following loading.

For example, the angular reading position may be chosen so as to cover a sufficiently broad internal zone of the apparatus. In the case of a store with rotating circular base and rectangular external housing, a preferred zone may be along an inner corner edge of the housing.

Advantageously, the position of the reader element covers a few steps (for example, one or two steps) in the preferential direction of movement of the store, "step" being understood as meaning the movement of the store for positioning in sequence two immediately successive compartments behind the hatch.

As will be clarified below, with positioning of the reader elements in a position different from the loading position, the control unit may read the contents of the compartments after loading of these compartments has been completed and the store has moved (for example for an operation for loading compartments in a following column) so as to bring the compartments to be read into the reading position opposite the reader elements.

Such a solution may, for example, be preferable when the positioning of the reader elements (for example owing to the type of tag to be read) is incompatible with the travel path which the articles must follow towards the compartments in the loading position. For example, in some cases it may be preferable for the reader element to be situated in front of the radial opening of the compartment in which the article with the tag to be read is present and this might obstruct the travel path of the article.

For some short-range tags or tags which cannot be easily distinguished, during reading, from other tags in the nearby compartments, if reading is performed from a relatively far distance, it has been found to be advantageous for the reader elements to be able to enter into the compartments so as to move towards the articles and take advantage of any screening which is offered by the walls of the compartments made of a suitable screening material (for example metal). For example it may be possible to use a UHF type tag which has a wide range (in some cases also several tens of meters) resulting in the risk of a same reader element reading several tags in different locations of the store. It may therefore be useful to move the reader element as close as possible to the tag, so as to limit the reading power and also confining it within the compartment so as to avoid incorrect reading also of nearby tags.

In the embodiment shown in FIGS. 5, 6 and 7, this possibility of movement of the reader elements is also shown.

In particular, the reader elements 131 may be positioned on a mobile structure 132 so that they can be moved between a non-operative position outside of the compartments, shown in solid lines in FIGS. 5, 6 and 7, and an operative or reading position within the compartments so as to be as close as possible to the articles which may be present, shown in broken lines in FIGS. 5, 6 and 7. The movement may be performed by means of a suitable actuator 133, for example a linear electric actuator operated by the control unit 18.

Advantageously, the mobile structure 132 moves with a rectilinear movement between the two positions, even though a different movement, for example a curved or rotary movement, may also be used.

During movement of the store, the structure with the reading elements is in the non-operative position, so that the structure does not interfere with the movement of the store. When, instead, it is necessary to read the tags of the articles which may be present inside the compartments, the store is stopped with the compartments concerned arranged in the angular reading position and the reading elements are advanced into the operative position.

Obviously, in the case where instead no approach movement is required for reading, the mobile structure may also not be present, being replaced by a stationary structure, or may be kept stationary, as may be now easily imagined by the person skilled in the art. As can be clearly seen in FIGS. 6 and 7, the mobile structure may comprise a comb-like frame, for example cut from a metal sheet, formed by a vertical part from which arms directed towards each shelf of the store project and which have corresponding reading elements 133 mounted on their ends.

The reading system may also comprise both the reader elements 31 and the reader elements 131 so as to be able to choose between the two reading modes depending on the requirements and/or the types of tag to be read. This solution will comprise a combination of that for example shown and described with reference to FIG. 4 and that shown and described with reference to FIGS. 5, 6 and 7. This is also schematically illustrated in FIG. 5 with the reader elements 31 shown in broken lines. The block 27 described above of the control unit 18 may be connected to all the reader elements 31 and 131 in order to perform global sequential scanning thereof or selective reading of only the reader elements 31 or 131, as may be now easily imagined by the person skilled in the art.

In the case where greater electromagnetic isolation from the outside is required during reading, it is also possible to consider using in the read zone a suitable (in particular metal) screening partition for closing the opening of the compartment inside which the tag to be read is present.

An example of such a partition is schematically shown in broken lines, denoted by 36, in FIGS. 5 and 7. It may be movable together with the reading elements or be fixed in the reading position at a small distance from the opening of the compartments and, in this case, with a suitable passage to be passed through by the reading elements. Moreover, it is possible to use a partition for each compartment in the reading position or use a single partition which closes off all the compartments in the reading position, as schematically shown in broken lines in FIG. 7.

Owing to the principles of the invention, the loading step is greatly speeded up and at the same time rendered more reliable.

During loading of the article, the operator responsible for performing filling may effect, via the user interface, activation of the loading mode of the apparatus. This may be performed, for example, by introducing a suitable password and/or by reading of a suitable operating badge by the badge reader 32.

During loading, the apparatus will move the store so as to bring at least one empty compartment behind one of the hatches and allow access to the compartment. For example, in the case of electrically controlled hatches, the unit will allow access by releasing the hatch and/or moving it into the open position. If need be, the unit may also activate the corresponding indicator lamp 22, where present, so as to visually signal to the operator the position of the compartment to be accessed. The operator may then introduce the article into the compartment.

Advantageously, owing to the principles of the present invention, for an even greater loading speed, the apparatus may also activate simultaneously the opening of several hatches corresponding to empty compartments. The operator may freely introduce the various articles available into the open compartments, without having to follow a predefined order during insertion of the various articles and/or take into consideration an association between compartment and article. The operator may thus follow the introduction sequence which he/she considers to be most appropriate or convenient (for example from the top downwards) or no sequence at all. The system will read, in any case, owing to the plurality of reader elements 31 and/or 131, the tag of each article and perform automatically the correct association between compartment and article introduced into it and memorize it.

The control unit may thus safely store in the memory 30 the association (for example in table form) between the position information of one compartment and the data for recovery of the article introduced into it, for future location and withdrawal during normal operation. The association may also be communicated by the control unit 18 to a database or remote management system, so as to update for example a central system for managing several automated dispensing apparatus. This may also be useful for managing remotely a service for refilling the dispensers.

In the case where reader elements close to the entry/exit zone are used, for example the reader elements 31, the control unit may detect and read the tags directly as the article passes towards the store compartment.

If, instead, reader elements in a reading position different from the entry/exit passage zone are used, for example the reader elements 131, the control unit may instead detect and read the tags after they have been introduced into the compartment, waiting for the movement of the store, for example due to the successive loading of sequential compartments, to bring the specific compartment into the reading position. Reading may be advantageously performed when the store is at a standstill for loading of a following column, such that the introduction of the articles and reading of the article in a previously filled column may be performed in parallel.

For example, during manual loading of the compartments of a column, the system may move the reader elements 131 forward so as to introduce them into the compartments of the column which has arrived in the reading position, carry out reading of the tags in order to store the data and the positions, extract the reader elements and wait for the next movement.

If required, the readers may be obviously also arranged in a reading position such as to manage to read the tags of articles inside the compartments even when arranged in the loading or unloading positions, and perform reading after loading, but before movement of the store, or also during a subsequent reading step separate from the loading step, bringing the compartments back into the reading position.

In any case, in the example shown, once loading of the empty compartments of a vertical column of compartments has been completed, the operator may signal to the plant the need to load further articles and the store may move so as to bring the next column of empty compartments opposite the hatches and open the hatches corresponding to the empty compartments of this next column, and so on, until the loading operations have been completed.

Between the end of loading of one column and the movement for loading the next column, the system may close all the controlled hatches, so as to avoid any danger for the operator and possible malfunctions.

If required, in the case of reading by means of the reader elements which detect directly the passage of the article towards the destination compartment, the system may also activate operation for passing to the next column automatically, once the reader elements have detected filling of all the empty compartments in the column. Again in the case of immediate reading during introduction, the system may close all the hatches as the articles are introduced into them, so as to prevent the operator from inserting by mistake an article into a compartment which is already occupied.

Once the loading operations have been terminated, via the user interface the operator may reset the normal dispensing mode and the apparatus will thus become operative again for the normal dispensing operations.

In an operational variant, for example in the case of a completely empty store or where during loading inaccessibility to the products already present in the store is not required, it is possible to open completely access to the store via the main door and introduce and/or reorder the articles inside the store without passing via the hatches 14.

This mode of operation is obviously much faster, not requiring for example rotation of the store for each column, but only in order to make visible the side of the store which is accessible via the main door.

Once the loading operations have been completed and the door closed where necessary, the control unit is activated so as to perform a complete scan of the store, bringing each compartment opposite the reader elements in order to acquire the data of all the articles inside the compartments and memorize it. Once scanning has ended, the apparatus may return to its normal operative dispensing condition.

In any case, a complete scan may also be useful for making an inventory of the contents of the store when, for example, it is wished to ensure the consistency of the data in the memory compared to the actual contents of the store. Non-authorized removal of articles may thus also be detected when the store is fully open.

During normal operation of the apparatus for the dispensing operations, the user who wishes to withdraw an article must merely enter in the apparatus the data necessary for requesting the article. The mode of entry and the nature of this data will depend for example on the type of articles and their use.

In particular, the user may advantageously identify him/herself by means of an electronic badge (via the appropriate reader 32 of the apparatus) and select on the user interface which articles is to be withdrawn from among those which are permitted. Whenever a user selects an article, the control unit receives instructions relating to a request for emission of the article, obtains from the memory the information regarding the compartment in which the desired article is present and moves the store, based on the position information of the compartment, until the compartment which contains the article is positioned opposite one of the access hatches. The hatch to be opened is advantageously identified by the lighting up of the corresponding indicator lamp 22, if present. If the hatch is motor-driven, it may open automatically or it may be simply released so as to allow manual opening thereof. Once the article has been removed, the user may signal the end of the withdrawal operation and/or close the hatch and the apparatus returns into the standby state for the next request, recording in the memory the empty condition of the compartment from which the withdrawal was made.

If desired, in the embodiment shown in FIG. 4, the apparatus may read the tag also during extraction of the article, in order to ensure that the article being dispensed is the correct one and, in the case of error, signal this promptly to the user.

At this point it is clear how the predefined objects have been achieved.

With the apparatus according to the invention it is possible to perform loading simply and quickly, while ensuring a high level of reliability as regards the correctness of the loading operations and the subsequent withdrawal step. Depending on the requirements and preferences, the operator who performs loading may be obliged to follow the instructions of the machine (which for example may open one hatch at a time) or be left free to define personal loading strategies, with the machine which simply opens or allows opening of all the corresponding hatches with empty compartments and with the operator who may insert the articles in the empty cells of a same random column or in an order which is convenient and not predefined.

In the most flexible loading form, complete access to the store may be permitted, while ensuring that the contents of the store are always correctly determined.

Obviously the description above of an embodiment applying the innovative principles of the present invention is provided by way of example of these innovative principles and must therefore not be regarded as limiting the scope of the rights claimed herein. For example, the form of the apparatus and of its internal components may be different from that shown, also depending on the type and number of articles which it may be required to dispense. A same apparatus may also comprise several internal stores and several rows of associated hatches. Moreover, in the case of a store with a structure movable in a different manner and/or in the case of reader elements slidably designed so as to be displaced between several shelves of the store, these reader elements may also be fewer in number than the number of shelves. The loading positions and unloading positions may also be separate.

The invention claimed is:

1. An automated dispensing apparatus for controlled dispensing of articles provided with associated RFID tags, comprising hatches for opening article entry and exit zones toward an outside of the automated dispensing apparatus, an internal motor-driven store with shelves divided into a plurality of compartments and intended to receive articles to be dispensed, upon command, through the hatches, a control unit provided with a memory intended to store the contents of the internal motor-driven store, the control unit being connected to the internal motor-driven store in order to operate the internal motor-driven store so as to bring a selected compartment into both of loading and unloading positions and allow loading and unloading of an article inside the selected compartment, and further comprising an RFID tag reader element connected to the control unit and wherein the control unit receives from the RFID tag reader element data read by the RFID tag reader element from an RFID tag and associates said data in the memory with the selected compartment in reading proximity to the RFID tag reader element, the RFID tag reader element being arranged in a predetermined reading position for reading the RFID tag inside the selected compartment when in reading proximity to the predetermined reading position and the RFID tag reader element being movable, upon command, between a non-operative position outside the selected compartment and an operative reading position inside the selected compartment.

2. The automated dispensing apparatus according to claim 1, comprising a plurality of RFID tag reader elements, wherein each of the plurality of RFID tag reader elements is arranged on one of the shelves.

3. The automated dispensing apparatus according to claim 1, characterized in that the predetermined reading position is an angular position around the internal motor-driven store and differs from the loading or unloading positions.

4. The automated dispensing apparatus according to claim 1, comprising a plurality of RFID tag reader elements, wherein the plurality is supported by a structure which is movable by means of an actuator so as to move the plurality of RFID tag reader elements between the non-operative and operative reading positions.

5. The automated dispensing apparatus according to claim 1, characterized in that the hatches are electrically controlled by the control unit so as to selectively allow or prevent access.

6. The automated dispensing apparatus according to claim 1, characterized in that a screening partition is provided so as to close the selected compartment which is subject to reading by the RFID tag reader element.

7. A method for controlling the automated dispensing apparatus according to claim 1, comprising the steps, performed by the control unit, of:
moving the internal motor-driven store so as to bring at least one of the plurality of compartments to be loaded into the loading position;
allowing access to the at least one compartment so as to allow loading in the at least one compartment of an article provided with the RFID tag
reading the data from the RFID tag of the article by means of the RFID tag reader element associated with the at least one compartment;
associating in the memory of the control unit the data read by the RFID tag reader element and position information of the at least one compartment so as to allow subsequent location of the article situated inside the at least one compartment.

8. The method according to claim 7, which during a sequence for emission of the article comprises the steps of:
receiving in the control unit instructions relating to a request for the emission of the article;
retrieving from the memory the position information of one of the plurality of compartments of the internal motor-driven store containing a requested article;
moving the internal motor-driven store on basis of the position information so as to bring into the unloading position the one compartment containing the requested article so as to allow withdrawal of the requested article.

9. The method according to claim 7 wherein the step of reading the data from the RFID tag using the RFID tag reader element associated with the at least one compartment is preceded by movement of the internal motor-driven store so as to bring the at least one compartment into a predetermined reading position.

* * * * *